(No Model.)

R. NEILL.
SWITCH RAIL FOR SLAUGHTERING ESTABLISHMENTS.

No. 267,100. Patented Nov. 7, 1882.

Cooling Room    Chill Room

Witnesses—
F. B. Townsend
Frederick J. Goodwin

Inventor—
Robert Neill
By Offield and Towle
Attorneys.

UNITED STATES PATENT OFFICE.

ROBERT NEILL, OF CHICAGO, ILLINOIS.

SWITCH-RAIL FOR SLAUGHTERING ESTABLISHMENTS.

SPECIFICATION forming part of Letters Patent No. 267,100, dated November 7, 1882.

Application filed March 16, 1882. (No model.)

*To all whom it may concern:*

Be it known that I, ROBERT NEILL, an alien subject of the Queen of Great Britain and Ireland, residing at Chicago, in the county of Cook and State of Illinois, have invented a new and useful Improvement in Switch-Rails for Slaughtering Establishments, of which the following is a specification.

It is usual in slaughter-houses to have two rails, or what is otherwise commonly known as a "double rail," opposite each killing-bed in connection with which switch-rails are used. These switches have imperfectly answered the purpose for which they were constructed, no sufficient device having been invented for opening and closing the switch.

My invention consists in connecting with each switch-rail a side arm secured above to a fulcrum and operated by a hand-lever, which permits the switch to be opened and closed readily and without loss of time.

Figure 1:
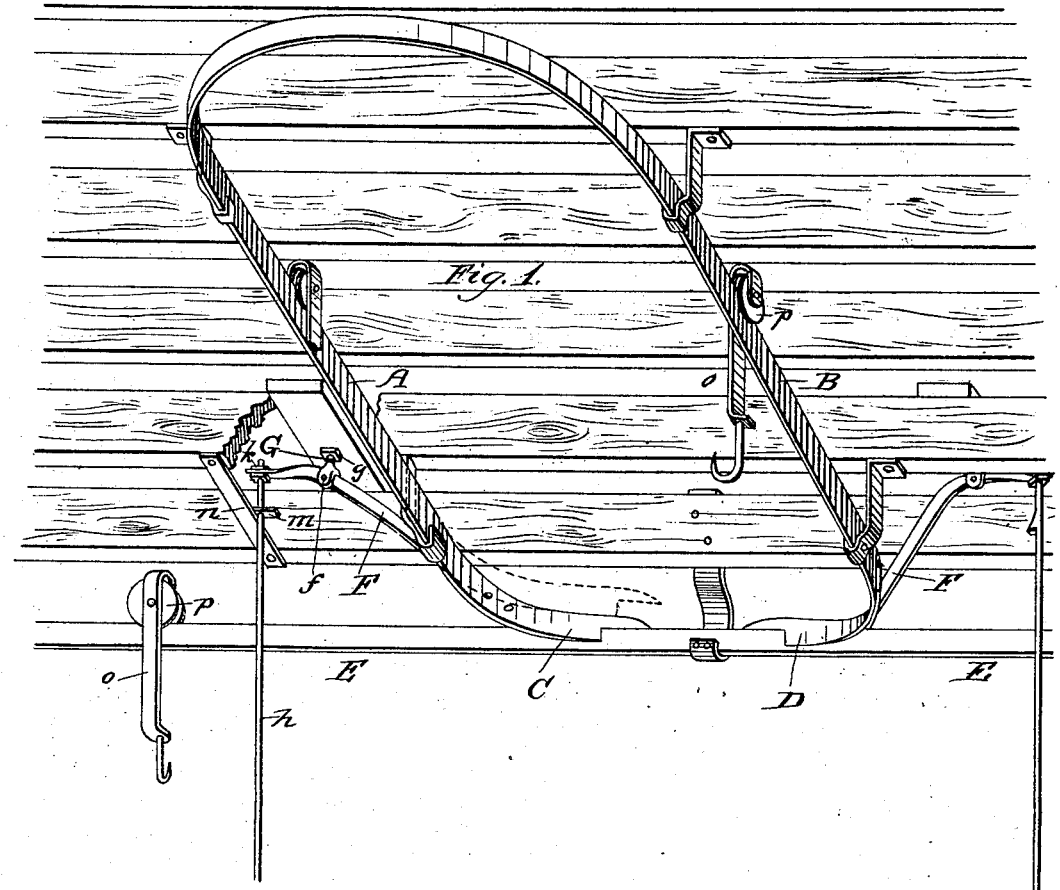
Figure 2:
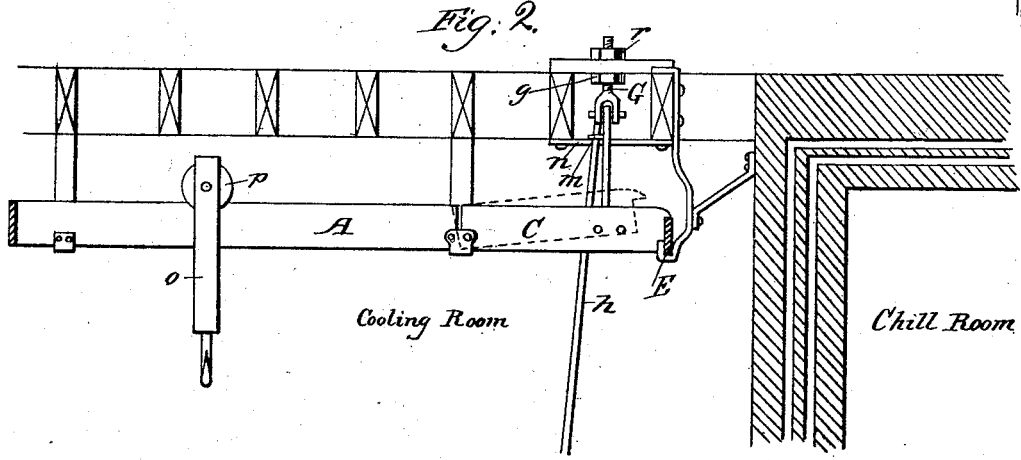

I have illustrated my invention by the accompanying drawings, making a part of this specification, in which Figure 1 is a perspective view of double rails as in common use, together with the switches having connected therewith my improvements. Fig. 2 is a sectional view of the same, showing one rail, together with one switch having my improvements attached. Fig. 2 further shows the position of the cooling and chill rooms, to better illustrate the advantages to be derived from the use of my invention.

Like letters refer to like parts throughout the several views.

A and B indicate the double rails.

C and D are the switch-rails, connected with the double rails.

E indicates the end rail, with which the switches can be connected or disconnected.

F is the arm by means of which the switch-rails are placed and displaced, one of these arms being connected with each switch-rail.

G is a rod, connected with some suitable support above, having near the lower end the bolt or pin *f*, which constitutes the fulcrum for the operation of the arm. This rod may be slotted so as to form a double bearing for the pin or bolt *f*, as shown in the drawings; but this is not necessary. Any construction which suffices to furnish the fulcrum required will answer the purpose. This rod G, I prefer to construct with a screw-thread at the upper end, so that it can be held in position and adjusted by means of the nuts *g* and *r* whenever the switch or the fulcrum becomes worn. I am by this means enabled to either raise or lower the switch-rail, as may be desired. The arm F, as will be seen, extends upward from the point where it is secured to the switch-rail at an angle of about forty-five degrees, and is continued a sufficient distance beyond the fulcrum *f* to permit of the operation of the arm readily upon this fulcrum by means of the rod or handle *h*, which is connected with the upper end of the arm F. This rod or handle *h*, I prefer to make screw-threaded at its upper end and to connect the same with the end of the arm F by the use of the nut *k*, which permits the adjustment of this handle. I so construct the handle or rod *h* as to have connected therewith a short cross-rod, *m*, or other suitable projection upon one or both sides thereof, which catches under the bar *n* and operates to hold the switch open while the rod is drawn down. The purpose attained by having the arm F placed at an angle of about forty-five degrees is that when the cross-rod *m* of the rod *h* is released from under the bar *n* the arm F, turning upon the fulcrum *f*, permits the switch-rail C to connect with the end rail, E, by the action of its own weight.

I have not mentioned the material required for the construction of my improved switch-rail attachments, as this does not seem to be necessary. It will be evident to all persons reading my specification that iron, steel, or other suitable material may be used.

These improvements are not designed for use where cattle only are killed, but may be applied to switches in establishments where slaughtering of all kinds is done.

The operation of my device is as follows: The slaughtered animals, after being severed and the halves secured to a pivoted hook connected with the flat bar *o*, bent at the top for the purpose of holding the sheave-wheel *p*, are run by means of such sheave-wheel along the double rails A and B to the point where the same are connected with the switch-rails C and D, the switch-rails being connected or disconnected, as may be desired, with the end rail, E, by means of the arm F and the rod or handle $h$, as before described.

Heretofore considerable time has been consumed in connecting and disconnecting switch-rails in slaughtering establishments, and it has been necessary to have the number of doors opening into the chill-room or ice-house correspond with the number of double rails in use. If a slaughter-house had twenty killing-beds and twenty double rails, it was usual to have a corresponding number of doors opening into the chill or ice room. It will be readily seen that this arrangement would of necessity result in causing a much larger quantity of ice to be required than if there were but a single door opening into the chill-room. My improved switch-lever device requires only one door opening into the chill-room, and this single door can be used to the same advantage as the greater number and without occasioning any delay in the operation of slaughtering. A great saving in ice necessarily results from this improved construction.

Another advantage to be derived from the use of my invention is that when cattle to be shipped have to be removed to a separate room and sorted much time and labor are saved in altering the switches alternately to get the cattle off from the double rails to the end rail with which said switches connect. Again, by the use of my improved construction all the rails on the same side can be emptied at one and the same time, while by the old method heretofore in use only one rail could be emptied at a time. It will thus be seen that there is great economy in my invention, and that it will operate to considerably increase the amount of slaughtering that can be done within a given space of time. My improved construction also embodies the elements of novelty and utility to a considerable degree, and supplies a need which has heretofore been felt in all slaughtering establishments.

Having thus described my invention, what I claim, and desire to secure by Letters Patent, is—

1. The combination, with a switch-rail, of the arm F, the fulcrum $f$, the rod or handle $h$, and the bar $n$, all arranged and constructed substantially as described, and for the purpose specified.

2. In an improved slaughter-house switch device, the switch-rail C, in combination with the arm F, the rod or support G, the fulcrum $f$, the nuts $g$ and $r$, the handle $h$, the nut $k$, the cross-rod or projection $m$, and the bar $n$, all arranged, constructed, and operated substantially as described, and for the purpose specified.

ROBT. NEILL.

Witnesses:
FREDERICK C. GOODWIN,
THOMAS PATTON.